(12) United States Patent
Klein

(10) Patent No.: US 7,610,821 B2
(45) Date of Patent: Nov. 3, 2009

(54) SIDE IMPACT DYNAMIC INTRUSION SIMULATOR

(75) Inventor: Reinhold S. Klein, Shelby Township, MI (US)

(73) Assignee: Toyoda Gosei Co., Ltd., Gun Aichi (JP)

( * ) Notice: Subject to any disclaimer, the term of this patent is extended or adjusted under 35 U.S.C. 154(b) by 0 days.

(21) Appl. No.: 11/780,201

(22) Filed: Jul. 19, 2007

(65) Prior Publication Data

US 2008/0016970 A1    Jan. 24, 2008

Related U.S. Application Data

(60) Provisional application No. 60/831,894, filed on Jul. 19, 2006.

(51) Int. Cl.
*G01M 19/00* (2006.01)
(52) U.S. Cl. .................................... 73/865.3
(58) Field of Classification Search . 73/116.05–116.06, 73/866.4, 865.3, 865.6, 12.01, 12.04, 12.09
See application file for complete search history.

(56) References Cited

U.S. PATENT DOCUMENTS

| | | | | |
|---|---|---|---|---|
| 5,485,758 A | * | 1/1996 | Brown et al. | 73/865.8 |
| 5,872,321 A | * | 2/1999 | Yannaccone | 73/865.3 |
| 6,035,728 A | * | 3/2000 | Jost | 73/865.3 |
| 6,561,007 B1 | * | 5/2003 | Bock et al. | 73/12.01 |
| 7,543,475 B2 | * | 6/2009 | Rieser et al. | 73/12.07 |
| 2005/0081656 A1 | * | 4/2005 | Saari et al. | 73/865.3 |

FOREIGN PATENT DOCUMENTS

| | | | |
|---|---|---|---|
| KR | 2000060814 A | * | 10/2000 |
| KR | 2001059102 A | * | 7/2001 |
| KR | 2004011925 A | * | 2/2004 |
| KR | 2004092157 A | * | 11/2004 |

* cited by examiner

*Primary Examiner*—Hezron Williams
*Assistant Examiner*—Tamiko D Bellamy
(74) *Attorney, Agent, or Firm*—Carlson, Gaskey & Olds

(57) ABSTRACT

A side impact simulator includes a primary sled connected to an actuator. A platform for supporting a vehicle seat and crash test dummy is slidably supported on the primary sled. A support is mounted to the platform, with a plurality of thrust rods slidably mounted therein. The primary sled includes a strike plate for striking an end of the thrust rods.

17 Claims, 5 Drawing Sheets

SIDE IMPACT DYNAMIC INTRUSION SIMULATOR

This application claims priority to U.S. Provisional Application Ser. No. 60/831,894, filed Jul. 19, 2006.

BACKGROUND OF THE INVENTION

The present invention relates generally to crash simulators. Many types of crash simulators have been developed from front impact testing; however, very little has been developed in the area of side impact simulators.

Current side impact test methods do not replicate the interior door trim deformation. Nor do they accurately model side impacts with different objects, such as the difference between a side impact with a tree or pole and a side impact with another vehicle.

SUMMARY

The test methodology and hardware arrangement disclosed herein provide multiple deformation/intrusion zones to more accurately replicate side impact intrusion into the occupant area. Various types of side impacts, such as trees, poles, vehicles, etc. can be simulated accurately.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
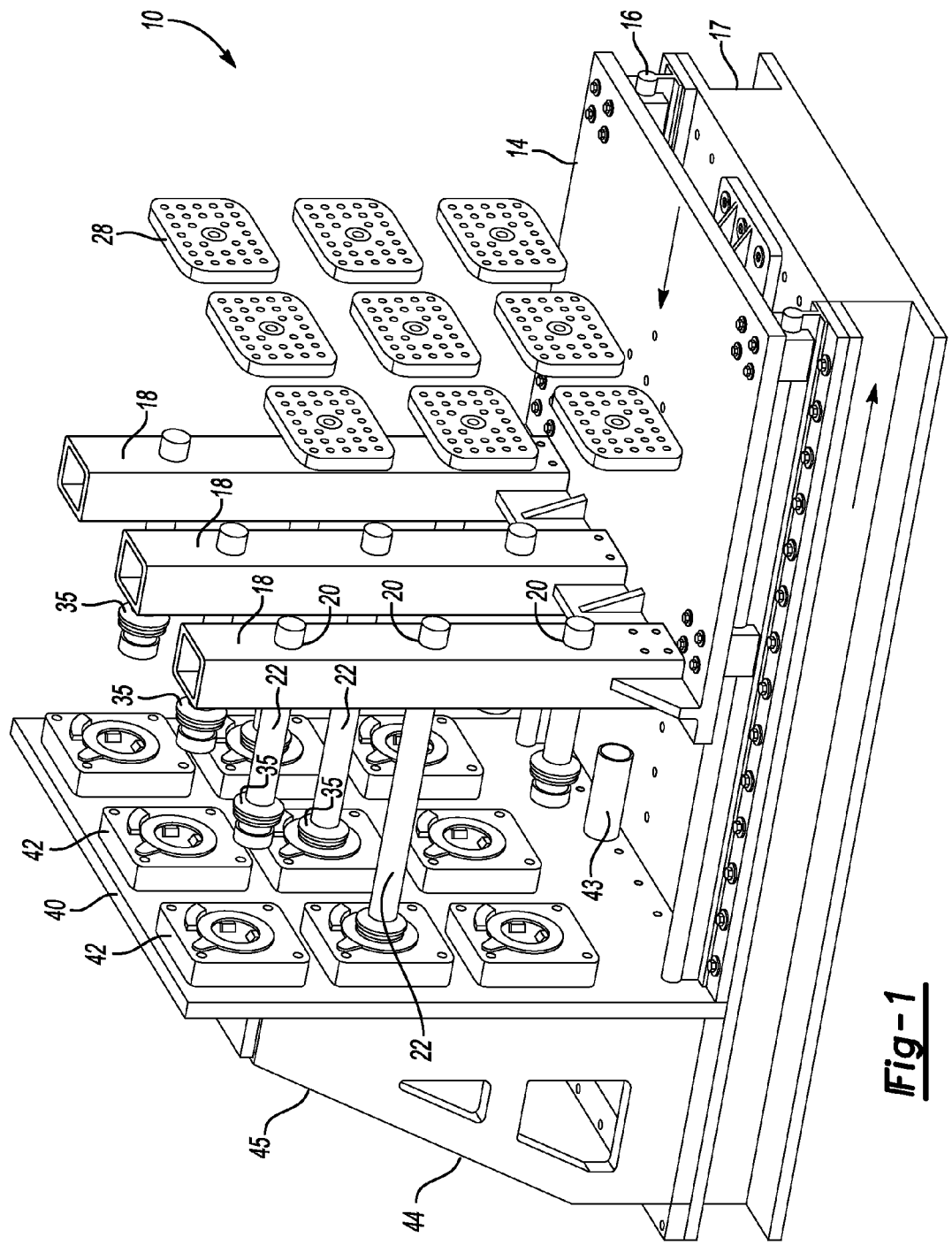
FIG. 1 is a partially exploded perspective view of a dynamic instruction simulator according to one embodiment of the present invention.

FIG. 1 illustrates an exploded view of selected portions of a vehicle test apparatus 10. The vehicle test apparatus 10 includes a floating interface plate 14 that slides along rails or linear guide bearings 16 that are mounted on a primary sled 17. The floating interface plate 14 includes a support, such as vertical columns 18 evenly spaced across the plate 14, each having multiple holes 20.

In the disclosed example, there are three columns 18, each with three through holes 20. There are nine thrust rods 22, one for each of the nine through holes 20. The nine thrust rods 22 represent nine different impact zones within an occupant area, although a different number of thrust rods 22 and holes 20 could be used.

Thrust rods 22 of various lengths extend through the holes 20, such that a first end protrudes through the column 18 toward the occupant area. The thrust rods 22 could be solid or hollow and could have any cross-sectional shape. A plurality of door trim plates 28 are provided, one for each thrust rod 22. Each trim plate 28 can be connected to the first end of the thrust rod 22.

The thrust rods 22 each have a collar 35 at a second end, which extends toward a strike plate 40 mounted on the primary sled 17. The strike plate 40 includes capture mechanisms or capture latches 42 that engage and hold the collars 35 on the second ends of the thrust rods 22 after contact to prevent separation between the strike plate 40 and the thrust rods 22, even if the primary sled decelerates after the impact.

A crush tube 43 or aluminum crush block is mounted near the bottom of the strike plate 40. The crush tube 43 limits travel of the floating interface plate 14 and simulates deformation of the vehicle floor pan.

The strike plate 40 is mounted on a vertical, laterally mounted fixture 45. The fixture 45 includes a mounting area 44 for onboard test instrumentation to save weight.

Figure 2:
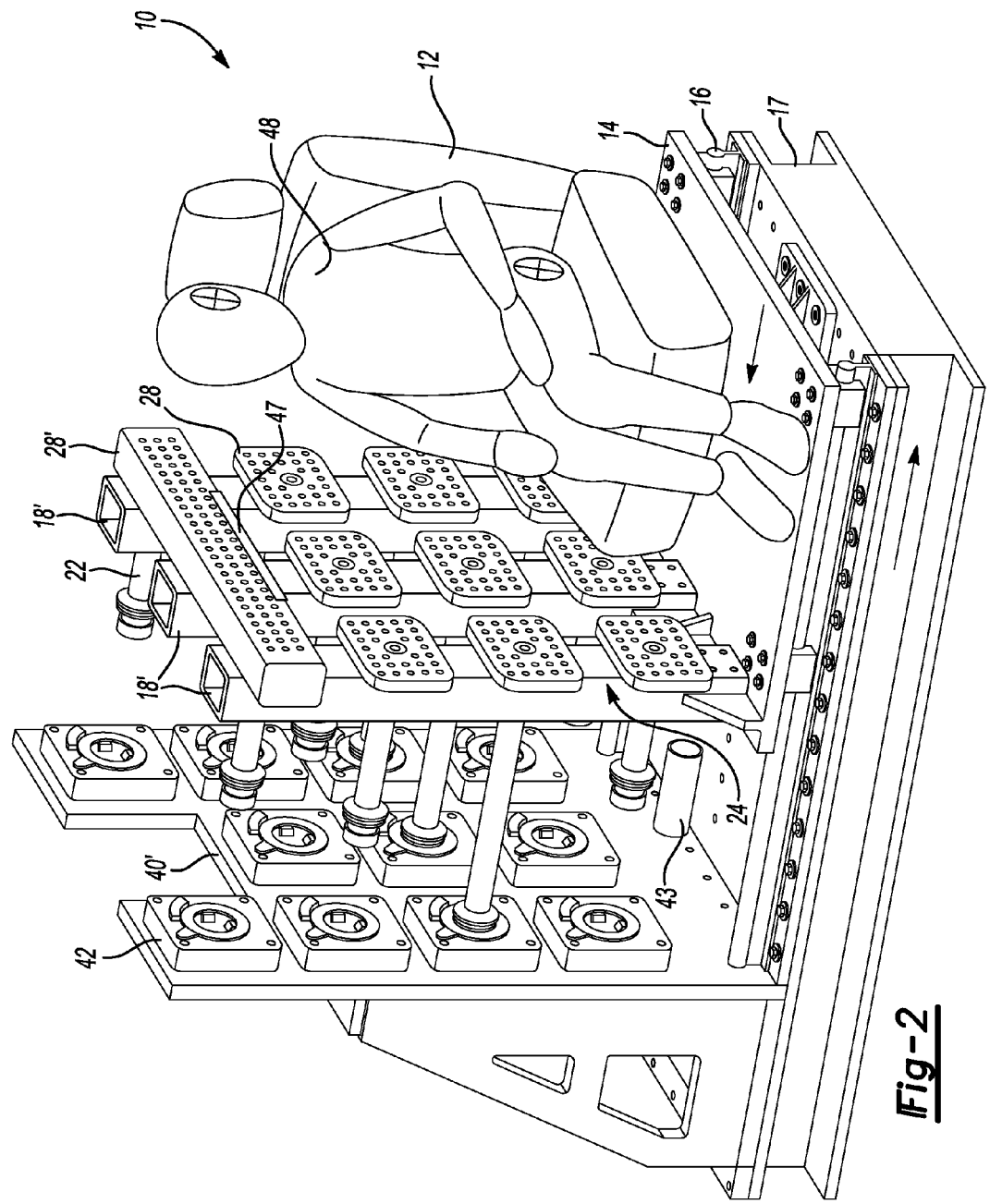
FIG. 2 is a perspective view of a test dummy in the simulator of FIG. 1, shown with alternate columns and an upper trim plate.

FIG. 2 illustrates an assembled view of the vehicle test apparatus 10, with optionally taller columns 18' and taller strike plate 42'. Optionally, an additional interface plate 28' is attached to the columns 18 above the door trim interface plates 28 to simulate a head liner/roof rail intrusion. In the disclosed example, the interface plate 28' includes an airbag 47, such as a curtain. Additional thrust rods 22 are connected to the optional interface plate 28' and additional capture latches 42 are also provided.

A crash test dummy 48 (with appropriate sensors) is positioned in a vehicle seat 12 in front of the door trim interface plates 28. An interior door trim panel 46 (not shown in FIG. 2, but shown in FIGS. 5 and 6) is mounted to the door trim interface plates 28 adjacent the dummy 48.

Figure 3:
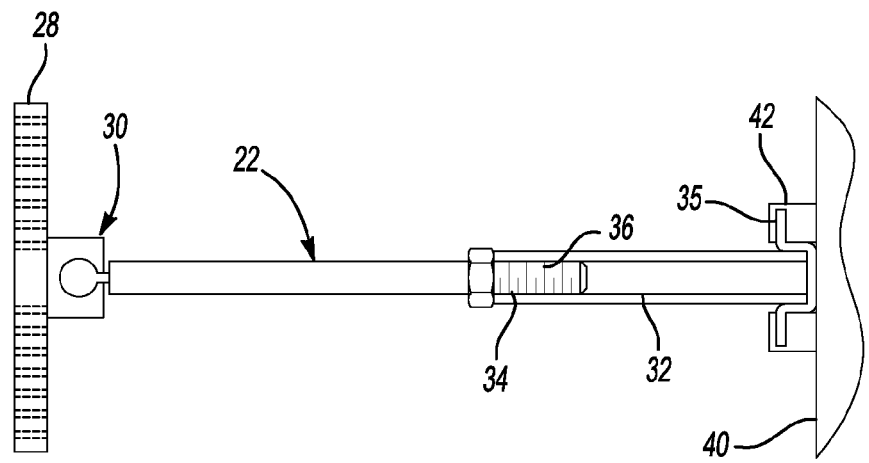
FIG. 3 is an enlarged side sectional view of one of the thrust rods of FIG. 1.

As can be appreciated from FIG. 3, each thrust rod 22 supports a door trim plate 28 that faces toward the occupant area. In this example, the door trim plates 28 are mounted by ball joints 30 to the thrust rods 22 to provide free angular movement. A larger number of thrust rods 22 with smaller door trim plates 28, or door trim plates 28 of varying sizes, could also be used.

Optionally, some or all of the thrust rods 22 may include a threaded end 34 that engages corresponding threads 36 on a pipe 32. This allows adjustment between the thrust rod 22 and the pipe 32 to a desired length for the crash test. In the disclosed example, the threaded end 34 and threads 36 provide about an inch of adjustment. This fine-tuning would be in addition to the fact that thrust rods 22 of different lengths are provided (as shown in FIGS. 1-2) to provide different intrusion into the occupant area. In the disclosed example, the thrust rods 22 also include a collar 35 so that the collar 35 can be captured by the capture latch 42.

Figure 4:
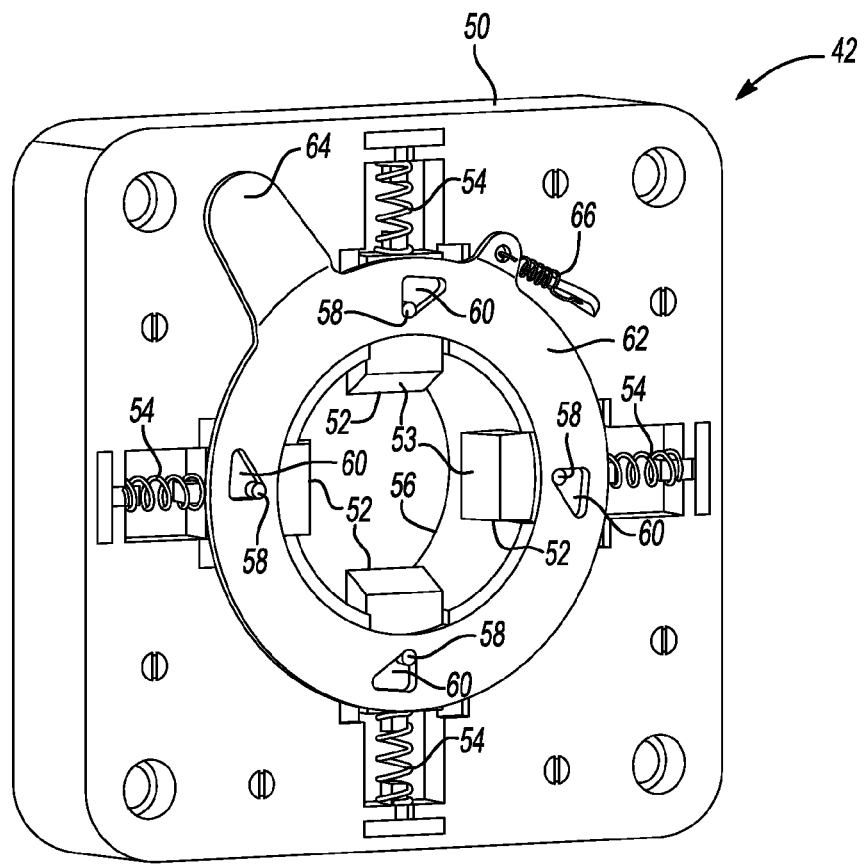
FIG. 4 is a front view of the simulator of FIG. 3 before a simulation.

FIG. 4 illustrates an interior of one of the capture latches 42 in more detail (with a cover plate removed). The capture latch 42 includes a housing 50 retaining a plurality of latch members 52 biased by springs 54 inward of a hole 56 through the housing 50. Each of the latch members 52 includes an angled leading surface 53 and protruding peg 58 that engages a triangular opening 60 in an annular release plate 64. When the thrust rod 22 (FIG. 3) contacts the capture latch 42, the collar 35 contacts the angled leading surfaces 53 of the latch members 52 to push the latch member 52 outwardly. After the collar 35 moves past the latch members 52, the latch members 52 spring back behind the collar 35. This locks the thrust rod 22 to the capture latch 42.

The release plate 64 is biased by a spring 66 to permit the latch members 52 to stay in the latched position. Upon rotation of the release plate 64, the angled edges of the triangular openings 60 contact the pegs 58 to move the latch members 52 to an unlatched position, so that the thrust rod 22 can be removed.

Figure 5:
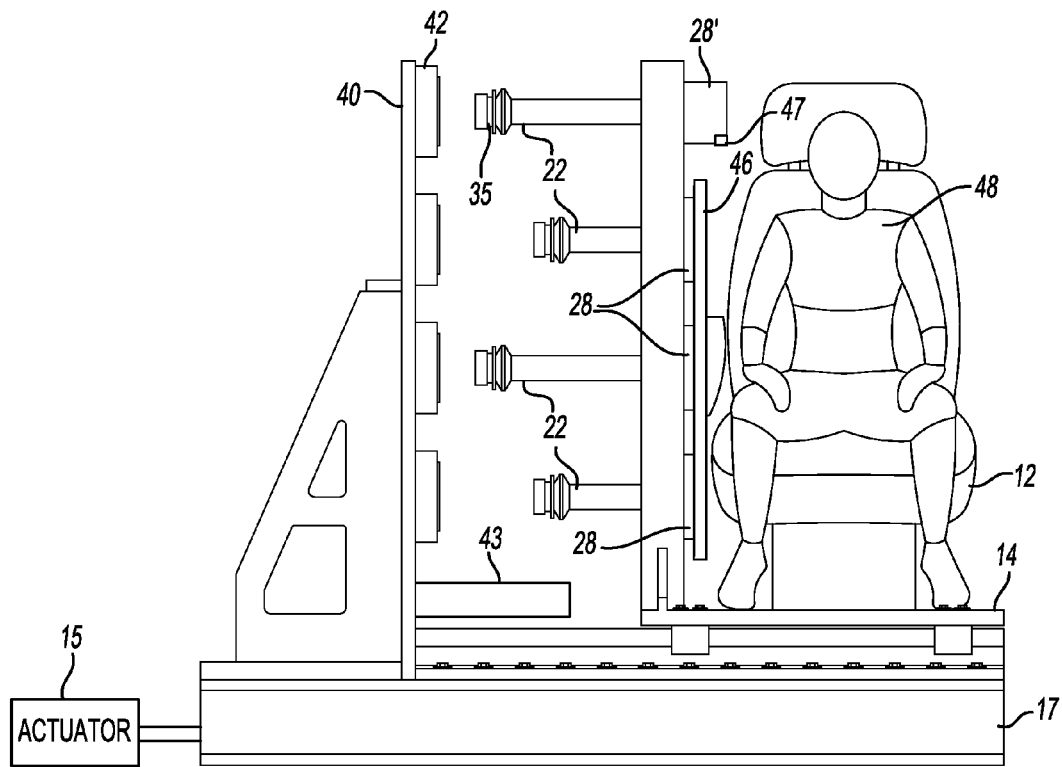
FIG. 5 is the simulator of FIG. 4 during a simulation.

FIG. 5 illustrates an example pre-crash test setup. Initially, the door trim plates 28 are positioned on or near an even plane that provides a surface to mount interior door trim 46. Although not shown, at least one of the thrust rods 22 may be positioned against the strike plate 40 to reproduce the target pulse. The remaining zones with shorter thrust rods 22 represent the target intrusion displacement.

In one example, the thrust rod 22 lengths are selected based upon target deformation zone data. Thus, shorter thrust rods 22 are used for less intrusion and longer thrust rods 22 for more intrusion. An actuator 15 (shown schematically) is connected to the primary sled 17 to transmit a large pulse force to the primary sled 17.

Figure 6:
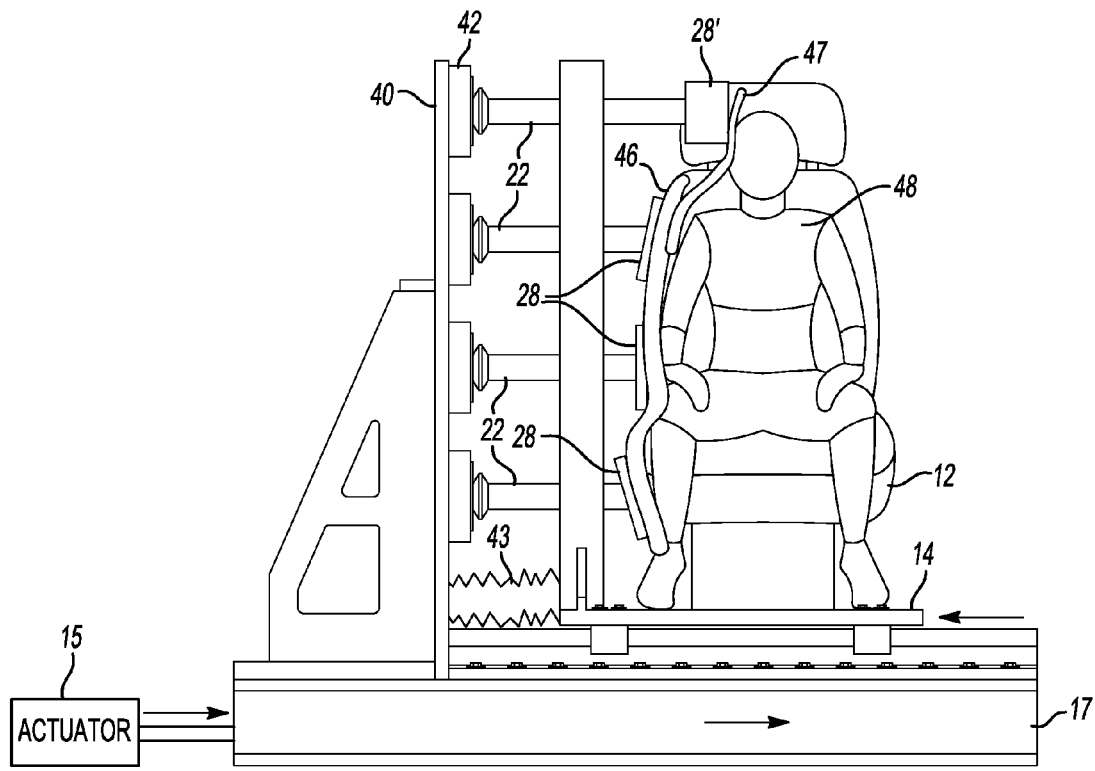
FIG. 6 illustrates one of the catch mechanisms.

FIG. 6 illustrates the vehicle test apparatus 10 during a test shot. The primary sled 17 is accelerated/decelerated by the actuator 15 with a target crash pulse. The thrust rods 22 contact the strike plate 40 as the primary sled 17 moves towards the floating interface plate 14. The timing and displacement of each door trim plate 28 is determined by the length of the corresponding thrust rod 22 and the final position of the floating interface plate 14 relative to the strike plate 40. The onboard test instrumentation deploys the airbags 47 at a desired time and collects crash force data from the dummy 48.

The crush tube 43 limits the movement between the primary sled 17 and the floating interface plate 14. The interior door trim 46 mounted on the door trim plates 28 deforms as it impacts the dummy 48 and seat 12. The effects of the airbag 47 can also be measured.

The actuator 15 may include a deceleration brake option. This provides the proper acceleration/deceleration kinematics that are typical of side impact crashes to the primary sled 17, which is translated into the interior door trim 46. The acceleration/deceleration kinematics, as well as the lengths of the thrust rods 22 and number and location of door trim plates 28 can be determined based upon measurements by sensors on a door trim panel during a test crash. With deceleration, the capture latches 42 prevent the thrust rods 22 from separating from the strike plate 42.

The vehicle test apparatus 10 and above-described method provide the advantage of repeatability and relatively low cost compared to standard destructive tests using prototype doors.

Figure 7:
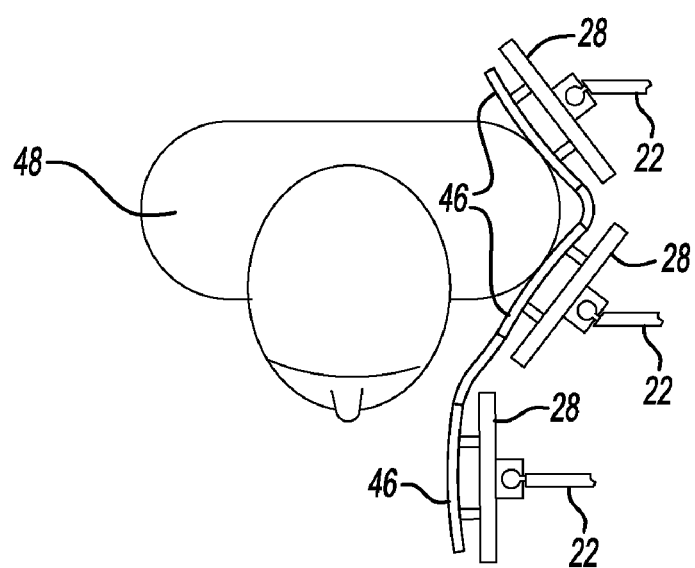
FIG. 7 illustrates three of the trim plates contacting the dummy 48.

FIG. 7 is a top view of the dummy 48 impacted by a row of thrust rods 22 and trim plates 28. As shown, the thrust rods 22 of different lengths cause different amounts of intrusion at different areas. The interior door trim 46 contacts the dummy 48 as the door trim plates 28 tilt and pivot.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps are for convenient reference in dependent claims and do not signify a required sequence of performance unless otherwise indicated in the claims.

What is claimed is:

1. A vehicle impact simulator comprising:
a primary sled including a strike plate;
a platform movably supported on the primary sled for supporting a crash test dummy;
a support fixed to the platform; and
a plurality of thrust rods slidably supported by the support such that each thrust rod can be contacted by the strike plate.

2. The vehicle impact simulator of claim 1 further including the crash test dummy positioned adjacent a first end of each of the thrust rods, the opposite second end of the thrust rods directed toward the strike plate.

3. The vehicle impact simulator of claim 1 wherein each of the plurality of thrust rods is slidably supported by the support and each thrust rod has a first end protruding from the support and a second end extending from the support toward the strike plate.

4. The vehicle impact simulator of claim 3 wherein each of the plurality of thrust rods has a different length.

5. The vehicle impact simulator of claim 3 further including a plurality of catch mechanisms on the strike plate for latching to the second ends of the thrust rods upon contact of the strike plate with the thrust rods.

6. The vehicle impact simulator of claim 5 wherein one of each catch mechanism and the associated thrust rod includes at least one biased latch member.

7. The vehicle impact simulator of claim 6 wherein the at least one biased latch member includes a plurality of biased latch members, further including a latch release that biases the plurality of latch members to release the thrust rod from the catch mechanism.

8. The vehicle impact simulator of claim 3 further including a plurality of door trim plates each mounted on one of the first ends of plurality of thrust rods.

9. The vehicle impact simulator of claim 8 further including a door trim panel mounted over the plurality of door trim plates.

10. The vehicle impact simulator of claim 9 further including a seat having a lateral side facing toward the support.

11. A vehicle impact simulator comprising:
a primary sled including a strike plate;
a platform movably supported on the primary sled for supporting a crash test dummy;
a crushable member between the primary sled and the platform;
a support fixed to the platform; and
a plurality of thrust rods slidably supported by the support such that each thrust rod can be contacted by the strike plate.

12. A vehicle impact simulator comprising:
a primary sled including a strike plate;
a platform movably supported on the primary sled for supporting a crash test dummy;
a support fixed to the platform;
a plurality of thrust rods slidably supported by the support such that each htrust rod can be contacted by the strike plate; and
an actuator for moving the primary slide such that the inertia of the platform causes the at least one thrust rod to strike the strike plate.

13. A method for simulating a vehicle impact including the steps of:
a) mounting a plurality of thrust rods slidably to a support, each of the thrust rods having a first end mounted to a trim plate and an opposite second end; and
b) contacting the second ends of the plurality of thrust rods in order to move the trim plates to simulate the vehicle impact.

14. The method of claim 13 wherein the support is slidably supported by a sled which fixedly supports a strike plate, and wherein said step b) includes the step of driving the strike plate into the second ends of the thrust rods.

15. The method of claim 14 wherein said step a) further includes the step of selecting from among different lengths of thrust rods.

16. The method of claim 14 wherein the plurality of thrust rods each have different lengths.

17. The method of claim 13 wherein said step b) further includes the step of contacting the second ends of the plurality of thrust rods with a strike plate, the method further including the step of connecting the second ends of the thrust rods to the strike plate during said step b).

* * * * *